United States Patent [19]

Nagura et al.

[11] Patent Number: 4,728,431
[45] Date of Patent: Mar. 1, 1988

[54] PERVAPORATION METHOD FOR SEPARATING LIQUIDS IN MIXTURE

[75] Inventors: Shigehiro Nagura; Minoru Takamizawa; Akira Yamamoto, all of Niigata, Japan

[73] Assignee: Shin-Etsu Chemical Co., Ltd., Tokyo, Japan

[21] Appl. No.: 771,985

[22] Filed: Sep. 3, 1985

[30] Foreign Application Priority Data

Sep. 21, 1984 [JP] Japan ................... 59-198373

[51] Int. Cl.$^4$ ............................................. B01D 13/00
[52] U.S. Cl. ..................................... 210/640; 210/490
[58] Field of Search ................ 55/16, 158; 210/640, 210/490, 500.2

[56] References Cited

U.S. PATENT DOCUMENTS

| | | | |
|---|---|---|---|
| 3,611,676 | 10/1971 | Christen et al. | 55/16 |
| 4,214,020 | 7/1980 | Ward et al. | 210/490 X |
| 4,218,312 | 8/1980 | Perry | 210/640 |
| 4,591,440 | 5/1986 | Higashimura et al. | 210/640 |

OTHER PUBLICATIONS

Masuda, et al., "Poly[1-(Trimethylsilyl)-1-Propyne] . . . High Gas Permeability", JACS, 1983, 105,7473 & 7474.

*Primary Examiner*—Frank Spear
*Attorney, Agent, or Firm*—Jules E. Goldberg

[57] ABSTRACT

The efficiency of the pervaporation method for the separation or enrichment of liquids in mixture, e.g. water and ethyl alcohol, can be greatly improved when the partitioning membrane is made of a polymeric composition comprising a specific organosilyl-substituted polyenic polymer composed of the monomeric moieties represented by the general formula

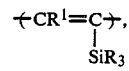

in which $R^1$ is a hydrogen atom or an alkyl group having 1 to 4 carbon atoms and the groups denoted by R are each independently a hydrogen atom, a monovalent hydrocarbon group having 1 to 8 carbon atoms or a silicon-containing organic group such as those represented by the general formula $-CH_2-SiMe_2R^2$, Me being a methyl group and $R^2$ being a lower alkyl group having 1 to 4 carbon atoms. The performance and durability of the membrane can be further improved when the polymeric composition is a polymer blend of the above described polyenic polymer and a poly(trimethyl vinyl silane).

4 Claims, No Drawings

PERVAPORATION METHOD FOR SEPARATING LIQUIDS IN MIXTURE

BACKGROUND OF THE INVENTION

The present invention relates to a pervaporation method for the separation of liquids in mixture to the respective components or enrichment of one component relative to the other. More particularly, the invention relates to a pervaporation method for the separation of liquids in mixture by use of a pervaporation membrane of a specfic polymeric material with high efficiency.

The pervaporation is a recently developed process for the separation of liquids in a homogeneous mixture into the respective component liquids in which the homogeneous liquid phase of the mixture is partitioned from the vapor phase with a membrane of a polymeric material and a pressure difference is produced between the liquid and the vapor phases, the pressure being higher in the liquid phase than in the vapor phase, or a carrier gas is passed through the vapor phase so that one of the component liquids in the mixture selectively or preferentially permeates through the membrane and is transferred into the vapor phase to cause separation of the components. This method of pervaporation using a polymeric membrane is promising and highlighted as a method for the separation or enrichment of liquids in mixture which can be separated with extreme difficulties in a simple method of conventional chemical technology such as an azeotropic mixture or a mixture of liquids having boiling points close to each other or when the liquid mixture contains one or more of components susceptible to denaturation or degradation by heating.

The efficiency of the pervaporation method for liquid separation largely depends on the performance of the polymeric membrane so that various kinds of polymeric materials have been proposed for the polymeric membrane used in the pervaporation method. Examples of the polymers hitherto proposed for the purpose include cellulose and cellulose derivatives, polyethylene, polypropylene, polystyrene, polyacrylonitrile, polyamide, polyimide, polyester, poly(tetrafluoroethylene), organopolysiloxane and the like as well as various kinds of related copolymers.

The efficiency of a polymeric membrane in the pervaporation is evaluated practically in two respects. Namely, the first of the criteria is the separation factor which is the ratio of enrichment obtained when the liquid mixture permeates through the polymeric membrane and the second is the velocity at which a liquid mixture permeates through the polymeric membrane. Needless to say, a polymeric membrane with larger values of the separation factor and the permeation velocity gives a higher efficiency of liquid separation. When the separation factor of a membrane for the liquids to be separated is small, a sufficiently high degree of enrichment is obtained only by use of the membranes in a multistage sequence. When the permeation velocity of a liquid through the membrane is small, on the other hand, separation of liquids in quantity requires a large area of the membrane or an extremely small thickness of the membrane so that disadvantages are unavoidable in the increased investment for the liquid separation plant or in the insufficient mechanical strength and durability of the polymeric membranes.

The separation factor of a first substance A relative to a second substance B, i.e. $\alpha_{A-B}$, by pervaporation is given by the equation $\alpha_{A-B}=(YA/YB)/(XA/XB)$, in which XA and XB are the weight fractions of the substances A and B, respectively, in the mixture before pervaporation and YA and YB are the weight fractions of the substances A and B, respectively, in the mixture after pervaporation through the membrane.

Taking an example in the separation of ethyl alcohol and water from their mixture by the pervaporation method, the separation factor $\alpha_{EtOH-H2O}$, i.e. the separation factor of ethyl alcohol relative to water, is smaller than 1 in the membranes of cellulose acetate and polyphenylene oxide so that the concentration of ethyl alcohol relative to water is small in the vapor phase than in the liquid phase while the separation factor is larger than 1 in a membrane of an organopolysiloxane so that the concentration of ethyl alcohol is larger in the vapor phase than in the liquid phase. When enrichment of ethyl alcohol in the vapor phase is desired using a membrane of an organopolysiloxane, however, no practically sufficient velocity of pervaporation can be obtained because a thin but strong membrane of unsupported organopolysiloxane can hardly be prepared due to the poor mechanical properties thereof. Nevertheless, no better polymeric materials than organopolysiloxanes are known as a material of pervaporation membrane when enrichment of ethyl alcohol relative to water is desired in the vapor phase.

SUMMARY OF THE INVENTION

An object of the present invention is therefore to provide a novel pervaporation method for the separation of liquids or, in particular, ethyl alcohol and water in mixture by use of a polymeric membrane having a separation factor of an organic liquid relateive to water larger than 1 and still free from the above described problem of poor mechanical strength of the membrane.

Thus, the pervaporation method of the invention for the separation of liquids in a uniformly mixed liquid phase comprises the steps of:

(a) partitioning the liquid phase from the adjacent vapor phase with a membrane; and (b) producing a pressure difference between the adjacent liquid phase and the vapor phase, the pressure being higher in the liquid phase than in the vapor phase, in which the membrane is made of a polymeric composition comprising an organosilyl-substituted polyenic polymer composed of the monomeric moieties represented by the general formula

$$\left(\!\!-CR^1\!\!=\!\!\underset{\underset{SiR_3}{|}}{C}\!\!-\!\!\right)\!\!, \tag{I}$$

the group denoted by $R^1$ being a hydrogen atom or a lower alkyl group and the groups denoted by R each being independently a hydrogen atom, a monovalent hydrocarbon group having 1 to 8 carbon atoms or a silicon-containing monovalent organic group.

DETAILED DESCRIPTION OF THE PREFERRED EMBODIMENTS

The polymeric membrane formed of the above described organosilyl-substituted polyenic polymer is advantageous as a pervaporation membrane with a large velocity of liquid permeation and a separation factor of an organic liquid larger than 1.1 relative to water in addition to the excellent mechanical strength and heat resistance to ensure a serviceable life of the membrane over a long period of use with stable performance. Further, the above described polymeric membrane is imparted with increased stability against degradation by the irradiation with light or, in particular, ultraviolet light when the polymeric composition is a polymer blend of the above defined organosilyl-substituted polyenic polymer and a poly(trimethyl vinyl silane) so that the durability of the pervaporation membrane can further be improved.

The essential component in the polymeric composition forming the polymeric membrane used in the inventive method is the organosilyl-substituted polyenic polymer composed of the monomeric moieties of the general formula (I). In the formula, $R^1$ is a hydrogen atom or a lower alkyl group having 1 to 4 carbon atoms including methyl, ethyl, propyl and butyl groups and the groups denoted by R are each independently a hydrogen atom, a monovalent hydrocarbon group having 1 to 8 carbon atoms including alkyl groups such as methyl, ethyl, propyl and butyl groups and aryl groups such as phenyl group, or a silicon-containing monovalent organic group represented by the general formula

$-(CH_2)_a SiMe_2 R^2$,    (II)

in which $R^2$ is a lower alkyl group, e.g. methyl, ethyl, propyl and butyl groups, chloroalkyl group or phenyl group, Me is a methyl group and a is 1 or 2. Preferably, $R^2$ is a lower alkyl group and a is 1 from the standpoint of obtaining a better performance of liquid separation. It is also preferable that not all of the groups denoted by R in the general formula (I) are simultaneously hydrogen atoms. It is of course that the organosilyl-substituted polyenic polymer is composed of two kinds or more of the monomeric moieties of the general formula (I).

The organosilyl-substituted polyenic polymer composed of the monomeric moieties of the general formula (I) can be obtained by the (co)polymerization of an organosilyl-substituted acetylene compound of the general formula

$R^1—C\equiv C—SiR_3$,    (III)

in which $R^1$ and R each have the same meaning as defined above, or a mixture of two kinds or more of such organosilyl-substituted acetylene compounds as diluted with an organic solvent such as toluene, cyclohexane and the like in the presence of a polymerization catalyst such as tungsten pentachloride $WCl_5$, niobium pentachloride $NbCl_5$, tantalum pentachloride $TaCl_5$ and the like at a temperature in the range from 30° to 100° C. The polymer formed in the solution can be purified by precipitating with addition of methyl alcohol. Examples of the organosilyl-substituted acetylene compound include 1-methyl-2-(1',1',3',3'-tetramethyl-1',3'-disilabutyl)acetylene, 1-methyl-2-trimethylsilyl acetylene and the like.

If desired, the polymer in the polymeric composition forming the polymeric membrane used in the inventive method can be a copolymer of the above described organosilyl-substituted acetylene compound and one or more of other monomers copolymerizable therewith such as an acetylene derivative having no organosilyl substituent groups. Further, it is optional to modify the properties of the polyenic polymer by partially hydrogenating the ethylenic unsaturation in the molecules. At any rate, it is preferable that at least 50% by moles or, more preferably, at least 80% by moles of the monomeric moieties in the polymer are the moieties expressed by the general formula (I). It is of course that the polymeric composition forming the membrane is a polymer blend of two kinds or more of the above described polyenic polymers.

The organosilyl-substituted polyenic polymer obtained in the above described manner should preferably have a weight-average molecular weight of at least $1 \times 10^5$ or, more preferably, at least $2 \times 10^5$ as calculated for polystyrenes. When the weight-average molecular weight thereof is smaller than $1 \times 10^5$, the polymeric membrane formed of the polymer would have no sufficiently high mechanical strength so that drawbacks are caused in the practical use thereof in the inventive method.

As is mentioned before, the polymeric composition forming the membrane used in the inventive method can be a polymer blend of the above described organosilyl-substituted polyenic polymer and a poly(trimethyl vinyl silane). Admixture of the poly(trimethyl vinyl silane) in the polymeric composition has an effect to impart the polymeric membrane with increased heat resistance and mechanical strength as well as improved stability against degradation by irradiation with light or, in particular, with ultraviolet light so that the membrane can be used for pervaporation prolongedly without decrease in the separation efficiency even under a condition of exposure to light.

In the preparation of the polymer blend of the organosilyl-substituted polyenic polymer and the poly(trimethyl vinyl silane), it is a usual way to dissolve the polymers in a suitable organic solvent to give a solution which can be very uniform by virtue of the high affinity of the polymers with each other. A film is prepared by casting the solution followed by evaporation of the solvent to dryness to give a very uniform and highly transparent polymer film. The blending ratio of the polymers should be controlled depending on the desired separation factor between the liquid components and the permeation velocity of the liquids in the polymeric membrane shaped from the polymer blend. It is usual that the polymeric composition comprises from 50 to 95% by weight of the organosilyl-substituted polyenic polymer and from 50 to 5% by weight of the poly(trimethyl vinyl silane). When the weight proportion of the former polymer is smaller than 50% by weight, the polymeric membrane would have no sufficiently high mechanical strength. When the weight proportion of the latter polymer is smaller than 5% by weight, on the other hand, no substantial improvements can be obtained in the properties of the membrane by taking the measure of blending the polymers.

The above mentioned poly(trimethyl vinyl silane) is a known polymer described in a journal article such as Journal of Polymer Science, volume 4, page 1053 (1964) and other literatures. The polymer can be prepared economically by the anionic polymerization of dehydrated and purified trimethyl vinyl silane in the presence of n-butyl lithium as the polymerization catalyst at a temperature of 50° to 70° C. for 20 to 50 hours in an atmosphere of an inert gas. The poly(trimethyl vinyl silane) should preferably have a weight-average molecular weight of at least $1 \times 10^5$ or, more preferably, at least $2 \times 10^5$ as calculated for polystyrenes since no sufficiently high mechanical strength can be obtained when the molecular weight is smaller than above.

It is essential that the polymeric membrane used in the inventive method should have a dense texture substantially free of pores. It is optional, however, that the membrane is a composite membrane formed by providing a coating layer of the polymer on a porous substrate such as a film, tube, hollow filament and the like or a non-uniform membrane having a dense layer of the polymer. The polymeric membrane can be prepared by the method of casting of a homogeneous solution containing the organosilyl-substituted polyenic polymer, optionally, as combined with a poly(trimethy vinyl silane) dissolved in a suitable organic solvent, usually, in a concentration of 0.1 to 10% by weight with admixture of various additives according to need. A hollow filament of the polymer can be prepared by spinning the polymer solution or dope extruded out of a concentric double-nozzle spinnerette. Further, composite membranes supported on a porous substrate of a tubular form can be prepared by coating a substrate prepared separately with the polymer solution followed by drying.

The porous substrate in a tubular or hollow filament-like form above mentioned can be shaped of a variety of polymeric materials including, for example, polysulfones, styrene-containing copolymers such as a copolymer of styrene and acrylonitrile, polycarbonates, cellulose derivatives, polyamides, polyimides, polyethers, polyesters, vinyl polymers, polymers of acetylene or acetylene derivatives and the like as well as polymer blends thereof. A substrate in the form of a hollow filament can be prepared of the above named polymers in a process, for example, comprising the steps of preparing a uniform dope by dissolving the polymer in a suitable organic solvent followed by filtration and defoaming, extruding the dope out of a concentrically annular double nozzle in a tubular form, partially evaporating the solvent from the dope of the extrusion, coagulating the extrusion by introducing it into a solvent poorly or not miscible with the solvent of the dope to form a hollow filament and drying the wet hollow filament with heat treatment. The hollow filament of the polymer can be imparted with porosity by admixing the dope with an inorganic powder.

The porous substrate in the form of a hollow filament is then coated with the polymer in several different ways. For example, the substrate is coated with the polymer solution by dipping therein or spraying or brushing therewith followed by drying. Alternatively, the polymer solution is passed through the porous hollow filament to form a coating layer on the inner wall thereof followed by drying so that a composite hollow filament is obtained with the polymeric membrane formed on the inner wall. It is of course optional that the above mentioned coating procedure is repeated several times to give the polymeric membrane having an increased thickness. The polymer solution preferably have a viscosity in the range from a few centipoise to 500 centipoise at 25° C. by controlling the concentration of the polymer to give a solution viscosity within the above mentioned range in consideration of the influence of the molecular weight of the polymer on the viscosity of the solution.

When the above described coating procedure is undertaken, the porous hollow filament as the substrate is provided with the layer of the polymer either on the outer surface or inner surface or both although it may be too much to say that the porous layer of the hollow filament is more or less impregnated with the polymer. The thus prepared composite hollow filament is advantageously used in the pervaporation method for the liquid separation with a large capacity by virtue of the large surface area of the polymeric membrane relative to the volume of the liquid mixture.

The organic solvent used in the preparation of the polymer solution as a precursor of the polymeric membrane is not particularly limitative insofar as the solvent is a good solvent for the polymer. Exemplary of the usable organic solvents are hydrocarbons such as benzene, toluene, xylene, cyclohexane, n-pentane and the like, halogenated hydrocarbons such as chloroform, carbon tetrachloride, tetrachloroethylenes, fluoromethanes and the like and cyclic ethers such as tetrahydrofuran and the like as well as mixtures thereof. Thickness of the polymeric membrane should preferably be in the range from 0.1 to 50 $\mu$m. When the thickness of the membrane is too large, the permeation velocity of the liquid mixture is so low as to cause a practical disadvantage by the decreased capacity for the liquid separation. When the thickness is too small, on the other hand, the mechanical strength of the membrane would be too low to withstand practical use.

The method of the present invention is practiced using an apparatus in which the primary, i.e. liquid, phase and the secondary, i.e. vapor, phase are partitioned with the above described polymeric membrane. When the polymeric membrane is used in the form of a plain film, it is preferable that the membrane is supported by a perforated plate for reinforcement. The primary side surface of the membrane should be in contact with the starting liquid mixture to be separated or enriched by the inventive method while the space facing the secondary side surface of the membrane is evacuated by a suitable means or a suitable carrier fluid, which is either liquid or gas, is circulated through the space. It is preferable that the liquid mixture in the primary phase is agitated or caused to flow in order to decrease a concentration gradient of a particular component in the vicinity of the membrane. The liquid mixture permeated through the polymeric membrane is collected and recovered at the secondary side.

The method of the present invention for the separation or enrichment of liquids can be performed in a wide range of temperature, usually, from 0° C. to 200° C. The pressure in the primary side of the membrane should preferably be kept in the range from atmospheric to 30 kg/cm$^2$ and it is essential that the mixture in the primary phase in direct contact with the membrane is in the liquid state.

The liquid mixture to which the method of the present invention is applicable include mixtures of water and an organic solvent such as ethyl alcohol and tetrahydrofuran and mixtures of organic solvents such as a mixture of acetone and methyl alcohol. The inventive method is applicable not only to binary liquid mixture but also to ternary mixture or mixtures of a larger number of liquids.

When a single-stage pervaporation is not sufficient to give a desired effect of separation or enrichment of a liquid mixture, a multi-stage sequence of repeated pervaporation process can be used to increase the efficiency of separation or enrichment.

In the following, the method of the present invention is described in more detail by way of examples, in which the expression of "parts" always refers to "parts by weight". In the chemical formulas appearing in the Examples, the symbol Me denotes a methyl group.

EXAMPLE 1

A reaction mixture prepared by dissolving 15 parts of 1-methyl-2-(1',1',3',3'-tetramethyl-1',3'-disilabutyl)acetylene Me—C≡C—SiMe$_2$—CH$_2$—SiMe$_3$ and 1 part of tantalum pentachloride in 200 parts of toluene was heated for 6 hours at 80° C. to polymerize the acetylene derivative and the reaction mixture containing the polymer was poured into a large volume of methyl alcohol to purify the polymer by precipitation. The thus obtained polymer had a weight-average molecular weight of $1.5 \times 10^6$ as calculated for polystyrenes. The polymer was dissolved in toluene and the solution was cast on the smooth surface of a horizontally held glass plate followed by evaporation of the solvent to give a dry film of the polymer having a thickness of about 9.0 μm.

Using the thus prepared polymer film as the partitioning membrane, a 50:50 by weight mixture of water and ethyl alcohol was subjected to pervaporation separation at 30° C. keeping the pressure in the primary phase at atmospheric and of the secondary phase at 1 mmHg or below. The vapor in the secondary phase was condensed, in a cold trap, into a liquid which was analyzed by the gas chromatography to find that the content of ethyl alcohol therein was 85% by weight corresponding to a separation factor $\alpha_{EtOH-H_2O}$ of 5.7. The velocity of permeation was 8.5 kg/m$^2$.hour.

EXAMPLE 2

A reaction mixture prepared by dissolving 7 parts of 1-methyl-2-trimethylsilyl acetylene, 7 parts of 1-methyl-2-(1',1',3',3'-tetramethyl-1',3'-disilabutyl)acetylene Me—C≡C—SiMe$_3$ and 1 part of tantalum pentachloride in 160 parts of toluene was heated for 3 hours at 80° C. to coppolymerize the acetylene derivatives and the reaction mixture containing the copolymer was poured into a large volume of methyl alcohol to purify the copolymer by precipitation. The thus obtained copolymer had a weight-average molecular weight of $1.8 \times 10^6$ as calculated for polystyrenes. A film of the copolymer having a thickness of 8.5 μm was prepared in the same manner as in Example 1.

Using the thus prepared polymer film as the partitioning membrane, a 80:20 by weight mixture of water and ethyl alcohol was subjected to pervaporation separation in substantially the same manner as in Example 1 except that the temperature was increased to 50° C. instead of 30° C. The results were that the content of ethyl alcohol in the recovered mixture was 59% by weight corresponding to a separation factor $\alpha_{EtOH-H_2O}$ of 5.8 and the permeation velocity was 2.5 kg/m$^2$.hour.

EXAMPLE 3

A toluene solution containing 1 part of the polymer obtained in Example 1, 0.05 part of a methylhydrogenpolysiloxane expressed by the formula

Me$_3$Si—(O—SiHMe)$_{28}$O—SiMe$_3$ and a platinum catalyst in an amount of 0.3% by weight based on the methylhydrogenpolysiloxane was cast on a glass plate and, after evaporation of the solvent to dryness, heat-treated for 1 hour at 120° C. to give a polymeric film having a thickness of 6.8 μm.

Using the thus prepared polymer film as the partitioning membrane, a 50:50 by weight mixture of water and ethyl alcohol was subjected to pervaporation separation in substantially the same manner as in Example 2. The results were that the content of ethyl alcohol in the recovered liquid mixture was 84% by weight corresponding to a separation factor $\alpha_{EtOH-H_2O}$ of 5.3 and the permeation velocity was 10.0 kg/m$^2$.hour.

EXAMPLE 4

Poly(trimethyl vinyl silane) was prepared by heating 100 g of trimethyl vinyl silane CH$_2$=CH—SiMe$_3$ with admixture of 0.2 ml of a 15% by weight solution of n-butyl lithium in n-hexane in an anhydrous condition at 60° C. for 10 hours under an atmosphere of nitrogen gas. The thus formed polymer was purified by dissolving the polymerization mixture in 1 liter of cyclohexane and then pouring the solution into a large volume of methyl alcohol to precipitate the polymer. The thus obtained poly(trimethyl vinyl silane) had a weight-average molecular weight of $4.2 \times 10^5$ as calculated for polystyrenes.

A polymer of 1-methyl-2-(1',1',3',3'-tetramethyl-1',3'-disilabutyl)acetylene having a weight-average molecular weight of $2.0 \times 10^6$ was prepared in the same manner as in Example 1 and 8 parts thereof and 2 parts of the poly(trimethyl vinyl silane) were dissolved in toluene. A film having a thickness of 9.0 μm was prepared by casting the toluene solution of the polymers.

Using the thus prepared polymer film as the partitioning membrane, a 30:70 by weigh mixture of water and ethyl alcohol was subjected to pervaporation separation in substantially the same manner as in Example 2. The results were that the content of ethyl alcohol in the recovered liquid mixture was 87% by weight corresponding to a separation factor $\alpha_{EtOH-H_2O}$ of 2.9 and the permeation velocity was 8.0 kg/m$^2$.hour.

EXAMPLE 5

A reaction mixture prepared by dissolving 10 parts of 1-methyl-2-trimethylsilyl acetylene and 1 part of tantalum pentachloride in 200 parts of toluene was heated at 80° C. for 10 hours to polymerize the acetylene derivative and the reaction mixture containing the polymer was poured into a large volume of methyl alcohol to purify the polymer by precipitation. The thus obtained polymer had a weight-average molecular weight of $2.0 \times 10^6$ as calculated for polystyrenes. A film of the polymer having a thickness of 8.5 μm was prepared in the same manner as in Example 1.

Using the thus prepared polymer film as the partitioning membrane, a 50:50 by weight mixture of water and ethyl alcohol was subjected to pervaporation separation in substantially the same manner as in Example 1. The results were that the content of ethyl alcohol in the recovered liquid mixture was 75% by weight corresponding to a separation factor $\alpha_{EtOH-H_2O}$ of 3.0 and the permeation velocity was 6.5 kg/m$^2$.hour.

EXAMPLE 6

A copolymer of 1-methyl-2-trimethylsilyl acetylene and 1-methyl-2-(1',1',3',3'-tetramethyl-1',3'-disilabutyl)acetylene was prepared in the same manner as in Example 2 from a mixture of 18 parts of the former monomer and 2 parts of the latter monomer. The copolymer had a weight-average molecular weight of $1.6 \times 10^6$ as calculated for polystyrenes. A film of the copolymer having a thickness of 1.2 μm was prepared by casting a toluene solution thereof.

Using the thus prepared polymer film supported on a cellulosic porous film (FM-120, a product by Fuji Photographic Film Co.) as the partitioning membrane, a 50:50 by weight mixture of water and ethyl alcohol was subjected to pervaporation separation in the same manner as in Example 1. The results were that the content of ethyl alcohol in the recovered liquid mixture was 83% corresponding to a separation factor $\alpha_{EtOH\text{-}H_2O}$ of 4.9 and the permeation velocity was 24.5 kg/m$^2$.hour.

EXAMPLE 7

A porous hollow filament of a polysulfone resin was prepared by extruding a 25% by weight solution of the resin in dimethyl formamide out of a concentrically annular double nozzle with water as the core fluid. The inner diameter of the outer nozzle was 0.8 mm and the inner capillary nozzle for the core fluid had an outer diameter of 0.5 mm and an inner diameter of 0.3 mm. The extrusion out of the nozzle was run over a distance of 200 mm in air and then introduced into a coagulation bath of water at 3° C. followed by washing with water and drying to give a porous hollow filament of the polysulfone resin.

The porous hollow filament of polysulfone obtained in this manner was dipped in a 0.5% by weight solution of the polymer prepared in Example 1 in n-pentane as the solvent for 2 minutes and then pulled up and dried to give a composite hollow filament.

Using the thus prepared composite hollow filaments having an overall effective surface area of 0.8 m$^2$, a 65:35 by weight mixture of water and ethyl alcohol was subjected to pervaporation separation at 50° C. The starting liquid mixture was circulated through the inside of the hollow filaments under an approximately atmospheric pressure as the primary phase while the pressure of the outside of the hollow filaments as the secondary phase was kept at 1 mmHg or below. The results were that the content of ethyl alcohol in the liquid mixture recovered from the secondary phase was 74% by weight corresponding to a separation factor $\alpha_{EtOH\text{-}H_2O}$ of 5.3 and the permeation velocity was 21.5 kg/m$^2$.hour.

What is claimed is:

1. A pervaporation method for the separation of ethyl alcohol from or enrichment of ethyl alcohol in a liquid mixture of water and ethyl alcohol which comprises the steps of:
    (a) partitioning the liquid phase from the adjacent vapor phase with a membrane; and
    (b) producing a pressure difference between the liquid mixture and the vapor phase, the pressure being higher in the liquid mixture than in the vapor phase, in which the membrane is made of a polymeric composition comprising from 50 to 95 percent by weight of an organosilyl-substituted polyenic polymer composed of the monomeric moieties represented by the general formula $$+CR^1=C+,$$
$$\quad\quad\;\; |$$
$$\quad\quad\; SiR_3$$

the group denoted by R$^1$ being a hydrogen atom or a lower alkyl group having 1 to 4 carbon atoms and the groups denoted by R each being a hydrogen atom, a monovalent hydrocarbon group having 1 to 8 carbon atoms or a silicon-containing organic group represented by the general formula $$—CH_2—SiMe_2R^2,$$

in which Me is a methyl group and R$^2$ is a lower alkyl group having 1 to 4 carbon atoms, and from 50 to 5 percent by weight of a poly(trimethyl vinyl silane).

2. The pervaporation method as claimed in claim 1 wherein the membrane has a thickness in the range from 1 to 50 μm.

3. The pervaporation method as claimed in claim 1 wherein the membrane of the organosilyl-substituted polyenic polymer is a coating layer on the surface of a porous hollow filament as a substrate.

4. The pervaporation method as claimed in claim 1 wherein the group denoted by R$^1$ is a methyl group, two of the groups denoted by R are methyl groups and the rest of the groups denoted by R is a group represented by the general formula $$—CH_2—SiMe_2R^2,$$

in which Me is a methyl group and R$^2$ is a lower alkyl group having 1 to 4 carbon atoms.

* * * * *